Figure 1:
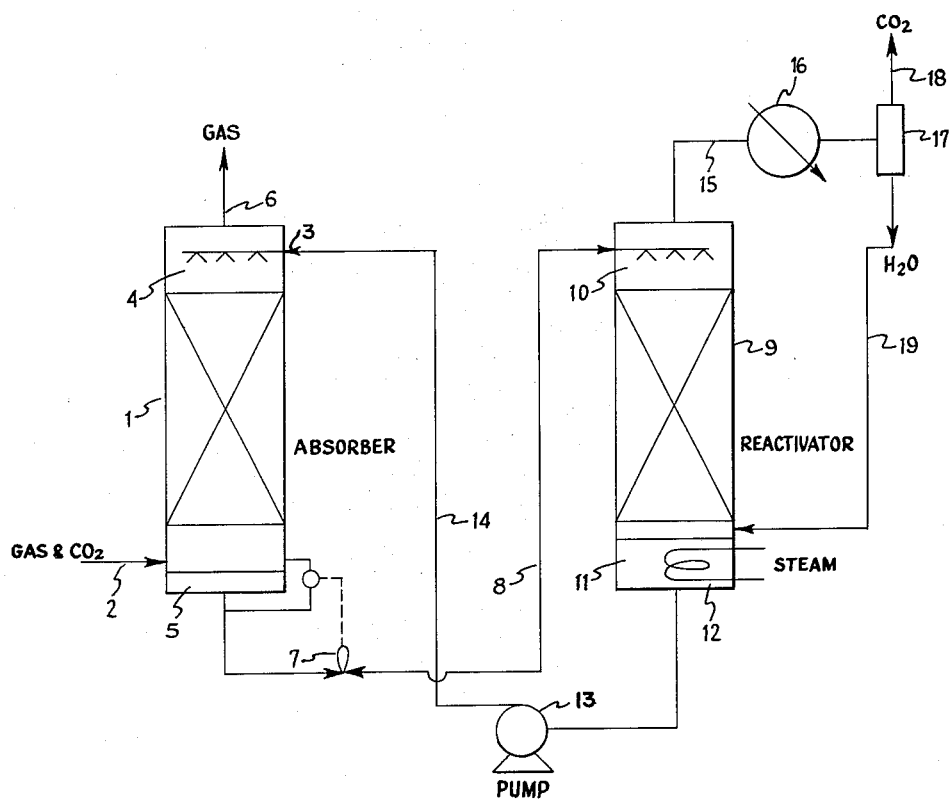

INVENTOR.
BERTRAND J. MAYLAND,
BY
ATTORNEYS.

United States Patent Office 3,144,301
Patented Aug. 11, 1964

3,144,301
REMOVAL OF CARBON DIOXDE FROM GASEOUS MIXTURES
Bertrand J. Mayland, Jeffersontown, Ky., assignor to Girdler Corporation, Louisville, Ky., a corporation of Ohio
Filed Apr. 21, 1961, Ser. No. 104,559
8 Claims. (Cl. 23—2)

The invention has to do with the purification of gaseous mixtures such as natural gas, coke oven gas, producer gas and the various synthesis gases by the removal therefrom of carbon dioxide. The purification process to which this invention pertains is one in which a water solution of potassium carbonate is brought into intimate association with the gaseous mixture in an absorber tower or like structure. As is well understood in the art, carbon dioxide is taken up by the solution with the formation of the potassium bicarbonate. In such processes the bicarbonate solution is regenerated in a desorber by use of reduced pressure and a stripping medium such as steam.

It is an object of this invention to provide a process for the purpose set forth of greater efficiency and improved performance, manifesting themselves in a lower carbon dioxide content of the scrubbed gases, lower steam or energy requirements for a given separation, or increased capacity allowing higher through-put, or various combinations of these.

The attainment of the improved performance involves certain problems in connection with corrosion; and it is another object of the invention to provide a process in which corrosion is minimized.

It is an object of the invention to provide a process in which the minimization of corrosion permits the use of ordinary steel vessels as distinguished from stainless steel or other expensive corrosion-resistant materials.

It is an object of the invention to solve certain problems in connection with the compatibility of additives desirable for the promotion of efficiency with corrosion-inhibiting agents.

These and other objects of the invention which will be set forth hereinafter or will be apparent to one skilled in the art upon reading these specifications, are accomplished by that procedure of which exemplary embodiments will now be described. Reference is made to the accompanying drawings which illustrate in a diagrammatic way an apparatus with which the invention may be practiced.

In the preferred practice of the invention the gas to be purified enters an absorber tower 1 at 2 and passes upwardly in countercurrent to a solution of potassium carbonate entering the tower at 3 and sprayed downwardly therein by a series of nozzles 4. The tower may, if desired, contain bubble trays to bring about intimate contact of the gases and the solution; but for practical purposes an adequate result may be accomplished by packing the tower with rings. The descending solution absorbs carbon dioxide from the gases and collects in the bottom of the tower at 5. The purified gases exit at 6 from the top of the tower.

Ordinarily the absorber operates at a higher pressure level than the regenerator so that the bicarbonate solution from sump 5 flows through control valve 7 through a conduit 8 to the top of a desorber or reactivator tower 9 wherein it is sprayed downwardly through nozzles 10. The tower 9 may also be packed with rings. The solution collects at 11 in the bottom of the tower where it is heated to the boiling point by superheated steam in a coil 12. The vapors passing upwardly through the tower 9 abstract carbon dioxide from the bicarbonate solution regenerating the carbonate. The regenerated solution is transferred by a pump 13 through a conduit 14 to the top of the absorber tower.

The gaseous effluent consisting principally of moisture and carbon dioxide from the desorber 9 passes out of the system through a conduit 15 to a heat exchanger 16 wherein its temperature is lowered sufficiently to permit condensation of the moisture to a separator 17. The carbon dioxide is carried away by conduit 18 to be used elsewhere while the separated water is returned by a conduit 19 to the solution at a convenient point such as the base of the desorber tower so as to maintain the desired solution concentration.

As will be seen from the drawing, in the preferred practice of the invention, the energy requirements are kept at a minimum by using essentially the same temperature levels in the absorber and in the regenerator, the temperature level being based generally on the boiling point of the potassium carbonate solution in the regenerator, and being about 220° F. to 240° F. This tends to reduce the capacity of the solution, an effect which may be counteracted in part by the use of higher concentrations. A preferred concentration of potassium carbonate in the aqueous solution is about 26%, but the concentration may be varied between about 18% and 40%.

The rate of absorption and desorption of $CO_2$ in carbonate solutions is relatively slow. At ambient temperatures equipment so large as to be non-commercial would be required to provide sufficient time of contact. Operating at elevated temperatures in the 220° to 240° F. range, the rates are improved considerably but the equipment is still somewhat large for a given service compared to other competitive processes. Various additives have been proposed and some are used commercially to improve the performance of the absorption-stripping system. The additives act in the nature of a catalyst to increase the rates of the absorption-desorption reaction.

In the search for more effective additives the ethenolamine series was investigated. Diethanolamine was found to be the most effective of the amines and to be superior in a number of respects to other additives that are used commercially considering such factors as catalytic activity, toxicity, availability, vapor losses, and absorption capacity.

Monoethanolamine was found to be just about as effective as diethanolamine but vapor losses at the elevated temperatures of the system were more serious and had to be contended with.

Relative absorption rates of $CO_2$ in carbonate solution with various additives were obtained in laboratory bubbler tests. Rates of absorption were measured at atmospheric pressure and temperatures around 200° F. These results are illustrated in the following tabulation:

*Table I*

| Solution | Relative rate |
|---|---|
| 15.6% $K_2CO_3$, 15.1% $KHCO_3$ | 1.0 |
| Citric acid, 1% | 1.2 |
| $As_2O_3$: | |
| 0.5% | 1.7 |
| 1.0% | 1.5 |
| 2.0% | 1.7 |
| 5.0% | 1.6 |
| DEA: | |
| 0.5% | 1.2 |
| 1.0% | 1.5 |
| 2.0% | 1.9 |
| 5.0% | 2.5 |
| 15% $K_2CO_3$, 21% $KHCO_3$ | 0.7 |
| $K_2TeO_3$, 1.5% | 0.4 |
| $K_2SeO_3$, 1.5% | 0.4 |
| DEA, 1.0% | 1.3 |
| TEA, 1.0% | 1.0 |
| $As_2O_3$, 1.5% | 1.0 |
| $NH_2SO_3H$, 1.4% | 0.7 |
| Sucrose, 1.5% | 0.7 |

These laboratory results show that diethanolamine is superior to other additives for the potassium carbonate $CO_2$ absorption systems. However, this does not establish the complete picture as to the performance of an additive in an absorption-stripping process. An additive may rate high in the static test and still be ineffective in the plant although the converse has not been demonstrated in any instance. Pilot plant data were collected on the better additives to establish actual performance in a dynamic system. For a given plant rate the independent variables of energy (steam) input and additive type and amount are correlated with the dependent variable of outlet $CO_2$ concentration. These results are summarized in the following:

Table II

Condition:
- Inlet $CO_2$ _____ 16%.
- Absorber pressure _____ 260 p.s.i.g.
- Stripper pressure _____ 3 p.s.i.g.
- 26% Reg. $K_2CO_3$ _____
- Circulation _____ 1.8 g.p.m.
- Rate _____ 1850 s.c.f.h. feed gas.

| Additive | Steam rates, lbs./hr. | | | | |
|---|---|---|---|---|---|
| | 38 | 36 | 34 | 32 | 30 |
| | Percent $CO_2$ out | | | | |
| 0.5% DEA | 1.4 | | 3.2 | | |
| 1.0% DEA | 1.4 | | | 2.2 | |
| .5% MEA | 1.6 | | | | |
| 1.0% MEA | 1.2 | | | | |
| 2.0% MEA | 1.2 | | 2.3 | | |
| 1% $As_2O_3$ | 1.4 | 1.6 | 2.3 | | |

Figure 2:
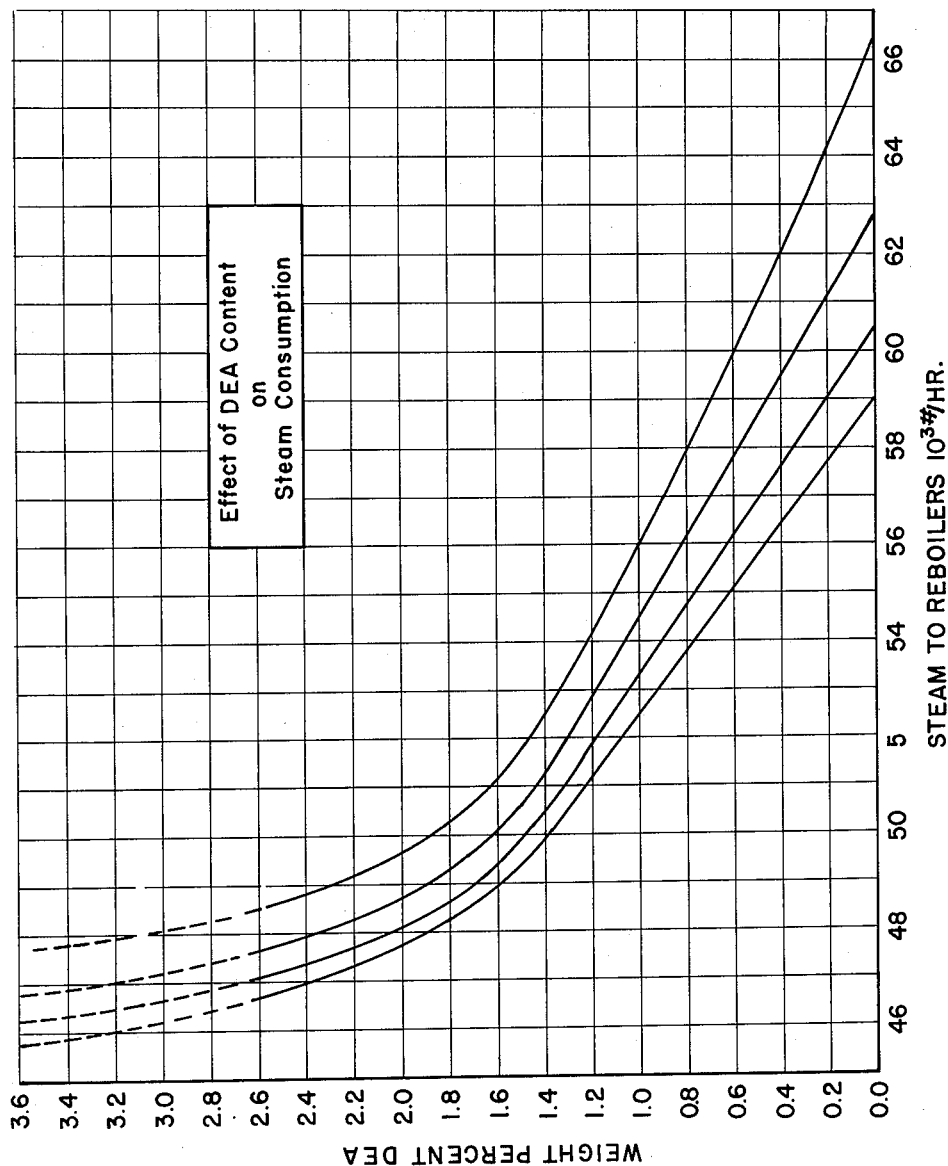

Tests were subsequently run in a full scale plant. The results of a series of tests are shown in FIG. 2. This definitely establishes an optimum DEA concentration. The improvement in performance as measured by steam saving at constant $CO_2$, or by $CO_2$ in outlet at constant steam rate, is approximately directly proportional to the amount of DEA additive used. This is true up to around 1.6% by weight where a relatively sharp break occurs. The effectiveness of further addition of DEA to the system drops off rapidly above this level.

Another advantage of the DEA additive in the $K_2CO_3$, $CO_2$ absorption system is the fact that DEA contributes to the solution capacity as well as catalyzes the absorption-stripping reaction. In plants characterized by a high $CO_2$ driving force in the feed gas, high energy efficiencies can be obtained if sufficient solution concentration is used. However, if the equivalent $K_2CO_3$ concentration is increased up to 35% by weight and above, precipitation of $KHCO_3$ can occur especially where conversion to the bicarbonate approaches 100%. This usually occurs during the temperature drop due to non-equilibrium flashing of steam when the rich solution passes from the absorber to the top of the regenerator. It has been found that this can be avoided by use of DEA in plants of this general type. The increased capacity possible with the addition of DEA is demonstrated by the following experimental results:

Table III

| | Without DEA | With 1.3% DEA |
|---|---|---|
| Percent $CO_2$ in feed gas | 30.0 | 31.0 |
| Absorber pressure, p.s.i.g | | |
| Regenerator pressure, p.s.i.g | 5 | 5 |
| Percent $CO_2$ in scrubbed gas | 1.1 | 0.54 |
| Steam efficiency, s.c.f. $CO_2$/lb. steam | 9.15 | 8.8 |
| Max. rate without precipitate, mols $CO_2$/hr | 628 | 729 |
| Carbonate concentration | 32.7 | 32.55 |

Because of high concentrations of the potassium carbonate solution, the conditions in the systems are highly corrosive to steel. Corrosion can of course be minimized by the use of stainless steel or other corrosion-resistant metals. These, however, are expensive; and it is an advantage of the procedure hereinafter taught that it permits the successful use of ordinary low carbon steels. Corrosion-resistant metals may be employed without departing from the spirit of the invention if desired; and the word "steel" as hereinafter used will therefore be understood as embracing any ferrous or ferrous alloy materials having suitable physical properties for use in the towers, pumps, conduits and other elements of the apparatus.

The employment of various corrosion inhibitors, such for example as potassium dichromate, has hitherto been suggested. Such employment, however, has not been wholly satisfactory. Reduction of the dichromate builds up a solids content in the solution, so that corrosion is aggravated by erosion, which is especially severe at points of high velocity such as pumps, control valves, bends in the conduits, and the like. Moreover, the problem is complicated by the presence in some plants of copper ions in the solution and by the action of hydrogen in the gas being purified.

It has been ascertained that in general the mixtures of DEA and carbonate contemplated by this invention are no more corrosive than a straight carbonate solution of the same concentration. This is demonstrated by the following data:

Table IV

| Sample | Elapsed time, hours | Corrosion rate on steel MPY |
|---|---|---|
| 26% $K_2CO_3$+$CO_2$ | 24 | 0.1 |
| | 48 | 0.1 |
| 26% $K_2CO_3$+$CO_2$+.5% DEA | 24 | 3.3 |
| | 43 | 0.1 |
| | 115 | 0.1 |
| | 189 | 0.1 |
| 26% $K_2CO_3$+$CO_2$+.5% DEA | 24 | 0.1 |
| 0.2% $K_2Cr_2O_7$ | 44 | 0.1 |
| | 124 | 0.1 |

When a system is started into operation with a mixture of DEA and carbonate in the solution there is an initial period in which the amine appears to accelerate corrosion, even though the corrosion rate drops to a low level after a relatively short period of operation. It is of course desirable to eliminate or minimize this initial accelerated corrosion.

But when DEA is added to a carbonate solution containing potassium dichromate as a corrosion inhibitor there occurs an immediate and continuous reaction which proceeds until the dichromate is completely reduced. This would seem to indicate that the initial accelerated corrosion could not be ameliorated by the use of an inhibitor. It has further been found that when DEA or MEA are added to a system already protected by dichromate, a progressive reduction of the dichromate occurs as shown by the following data:

Table V

Samples:
 I. 26% $K_2CO_3$, 2000 p.p.m. $K_2Cr_2O_7$, 1% DEA
 II. 26% $K_2CO_3$, 2000 p.p.m. $K_2Cr_2O_7$, 1% MEA Results:

| | $K_2Cr_2O_7$ concentration, mg./ml. | | After 4 days of boiling |
|---|---|---|---|
| | Before amine added | After amine added | |
| I | 2.37 | 2.11 | 2.08 |
| II | 2.37 | 2.11 | 2.04 |

Moreover, when DEA in the quantities hereinafter set forth is added to the carbonate solution containing potassium dichromate, the initial reduction of the dichromate and the precipitation of solids is so rapid that foaming and unstable operation are immediately apparent.

Despite these adverse indications, it has been discovered that if a system is started with a carbonate solution containing inhibitor but no amine, and is run for a short time after which the amine is added gradually, the initial accelerated corrosion will be avoided. Surprisingly, the corrosion remains at a low level despite the fact that the inhibitor is progressively reduced and eventually disappears from the solution. There is no foaming or unstable operation.

The reasons for this unexpected action are not fully known; but it is believed that the inhibitor produces a passivating coating on the steel which persists for a long period after the inhibitor is gone. In a plant operated in accordance with this invention it has been found that the measured corrosion rate remained low (on the order of 5 mils per year) four months after the test started.

It should be noted that when there is $H_2S$ in the feed gas it will react quantitatively with the potassium dichromate inhibitor. Ordinarily, the use of dichromate would not be advisable when the feed gas contains appreciable amounts of $H_2S$ because of the danger of plugging by precipitation of the reduced chromium oxide. However, a small amount is tolerable, depending upon the exact design characteristics of the plant. Up to 1000 p.p.m. can probably be handled without difficulty in the typical system. Higher amounts would have to be dealt with by special provisions for handling the precipitation.

Certain other factors influencing corrosion should be noted. It has been found that maintaining a high ratio of steel surface to solution volume will diminish the rate of reduction of the dichromate. This is shown by the following data:

*Table VI*

Samples:
 I. 26% $K_2CO_3$, 2000 p.p.m. $K_2Cr_2O_7$, 1% DEA, no steel.
 II. 26% $K_2CO_3$, 2000 p.p.m. $K_2Cr_2O_7$, 1% DEA, with steel.
 III. 26% $K_2CO_3$, 2000 p.p.m. $K_2Cr_2O_7$, 1% DEA, 10 p.p.m. $Cu^{++}$, with steel.

Results:

STATIC TEST

| | Hours on steam | Percent $K_2Cr_2O_7$ reduced | Percent amine | |
|---|---|---|---|---|
| | | | Initial | Final |
| I | 94 | 80.9 | 1.23 | 1.16 |
| II | 113 | 10.9 | 1.23 | 1.22 |
| III | 113 | 20.8 | 1.23 | 1.22 |

WITH ALTERNATE STRIPPING AND EXPOSURE TO SYNTHESIS GAS

| | Hours on steam | Percent $K_2Cr_2O_7$ reduced | Percent amine | |
|---|---|---|---|---|
| | | | Initial | Final |
| I | 95 | 83.6 | 1.25 | 1.18 |
| II | 95 | 10.4 | 1.25 | 1.24 |

The ratio of steel surface to solution volume will depend in part on the structure of the apparatus used; but the ratio may be increased by using steel rings, rather than ceramic or other rings, in the towers 1 and 9.

On the other hand, the presence of copper ions in the solution decreases the compatibility of the amine additives and the inhibitor, as also shown in the above data, and should be avoided as much as possible. Some traces of copper may be found in the steel used in the apparatus; but fittings, valves, conduits or other apparatus parts made of copper or brass should be avoided.

The quantity of inhibitor which may be used can be varied from about 1000 to about 3000 p.p.m., with about 200 p.p.m. being preferred. Other inhibitors such as sodium vanadate may be used in the process.

As has previously been indicated, the amount of amine may vary from about 0.5% to 2% of the carbonate solution, with about 1.6% being preferred. Where hereinabove reference has been made to a gradual addition of the amine, the most convenient way of accomplishing this is to form a solution of the amine in a separate vessel and then add it to the solution in the system at such a rate that the amine content of the solution will have been brought up to strength during a period of about 3 to 4 days.

The use of DEA is preferred as an additive in carbonate systems but MEA may also be used if provision is made to recover amine loss. MEA has been found to be more compatible with the dichromate inhibitor, as the following data will show:

Samples:
 I. 26% $K_2CO_3$, 2000 p.p.m. $K_2Cr_2O_7$, 1% DEA, no steel.
 II. 26% $K_2CO_3$, 2000 p.p.m. $K_2Cr_2O_7$, 1% DEA, with steel.
 III. 26% $K_2CO_3$, 2000 p.p.m. $K_2Cr_2O_7$, 1% MEA, no steel.
 IV. 26% KCO, 2000 p.p.m. KCrO, 1% MEA, with steel.

Results:

STATIC TEST

| | Hours on steam | Percent $K_2Cr_2O_7$ reduced | Percent amine | |
|---|---|---|---|---|
| | | | Initial | Final |
| I | 94 | 80.9 | 1.23 | 1.16 |
| II | 113 | 10.9 | 1.23 | 1.22 |
| III | 113 | 1.7 | 1.31 | 1.29 |
| IV | 113 | 2.5 | 1.31 | 1.30 |

WITH ALTERNATE STRIPPING AND EXPOSURE TO SYNTHESIS GAS

| | Hours on steam | Percent $K_2Cr_2O_7$ reduced | Percent amine | |
|---|---|---|---|---|
| | | | Initial | Final |
| I | 95 | 83.6 | 1.25 | 1.18 |
| II | 95 | 10.4 | 1.25 | 1.24 |
| III | 95 |  | 1.27 | 1.26 |
| IV | 95 | 0.2 | 1.27 | 1.28 |

MEA as an additive has been found to be more corrosive than DEA, in other words a carbonate solution containing MEA as an activator will have a higher corrosion rate than a carbonate solution containing DEA. If the system is one in which the solutions can be maintained at high chemical purity, this factor may be compensated for, in part at least, by maintaining some dichromate in the system at all times.

With the preferred activator the corrosion rate will remain low for a considerable period even after the disappearance of the dichromate. In commercial operations relatively small amounts of dichromate may be added from time to time to reintroduce the corrosion protection. However, it is not generally necessary with DEA to add dichromate until a renewal of the DEA content of the solution is desired, in which event the dichromate should be added to the system in advance of the DEA addition.

In exemplary operation, at the start, the desired volume of carbonate solution will be placed in the apparatus and the operation started. The inhibitor may be added with the solution or after the solution has been introduced. The apparatus will then be run for a length of time sufficient to insure that all exposed steel surfaces have been treated with the inhibitor, and preferably for a period of about 24 hours. Then the amine will be added gradually as above described. The initial acceleration of corrosion will be avoided; and the apparatus will operate for an extended period of time at a low overall corrosion rate. This period of time will vary with the apparatus and throughput; but will ordinarily be of the order of 30 to 360 days. Thereafter increments of inhibitor and activator may be added to prepare the apparatus for another extended period of operation.

Modifications may be made in the invention without departing from the spirit of it. The invention having been described in certain exemplary embodiments, what is claimed as new and desired to be secured by Letters Patent is:

1. In a regenerative process for purifying gaseous mixtures by removing carbon dioxide therefrom, in which process the gaseous mixtures are brought into intimate contact with a solution of potassium carbonate whereby carbon dioxide is absorbed from said gaseous mixtures with the consequent conversion of potassium carbonate to potassium bicarbonate, the concentration of the said solution being equivalent to that of a water solution containing substantially 18% to substantially 40% of potassium carbonate, the step of maintaining in the solution a content of substantially 0.5% to 2% of an amine chosen from a group consisting of monoethanolamine and diethanolamine and mixtures thereof, whereby to increase the efficiency of the process.

2. The process claimed in claim 1 wherein a dichromate inhibitor is added to the said solution.

3. The process claimed in claim 2 wherein the process is carried on in apparatus presenting steel surfaces to the solution, and in which the dichromate inhibitor is first added to the solution and the process carried on for a sufficient length of time to insure the exposure of the said surfaces to the solution containing the inhibitor, after which the amine is added gradually.

4. The process claimed in claim 3 in which the inhibitor is added to the solution in quantities of substantially 1000 to 3000 p.p.m.

5. The process claimed in claim 4 wherein the apparatus employed includes an absorber tower and a desorber tower and wherein the ratio of steel surface to solution is increased by packing the said towers with steel rings.

6. The process claimed in claim 5 in which the amine is diethanolamine and in which the process is allowed to proceed after the virtual disappearance of the inhibitor from the solution, but including the step of periodically renewing the inhibitor content and the diethanolamine content of the solution, by addition of the said substances in the order named.

7. The process claimed in claim 6 in which precaution is taken to prevent the presence of copper ions in the solution.

8. The process claimed in claim 5 in which the amine is monoethanolamine and in which the dichromate inhibitor is added to the solution at such intervals as to maintain therein at all times a small percentage of the inhibitor.

References Cited in the file of this patent
UNITED STATES PATENTS

| | | |
|---|---|---|
| 2,607,744 | Viles | Aug. 19, 1952 |
| 2,886,405 | Benson et al. | May 12, 1959 |
| 2,993,750 | Giammarco | July 25, 1961 |